United States Patent [19]
Hogan

[11] Patent Number: 6,064,748
[45] Date of Patent: May 16, 2000

[54] METHOD AND APPARATUS FOR EMBEDDING AND RETRIEVING ADDITIONAL DATA IN AN ENCODED DATA STREAM

[75] Inventor: Josh Hogan, Los Altos, Calif.

[73] Assignee: Hewlett-Packard Company, Palo Alto, Calif.

[21] Appl. No.: 09/008,027

[22] Filed: Jan. 16, 1998

[51] Int. Cl.[7] .................................................. G06K 9/00
[52] U.S. Cl. ........................ 382/100; 348/461; 380/200
[58] Field of Search .................................. 380/20, 5, 54, 380/23, 200, 202; 348/845, 845.2, 423, 461, 467, 473, 17; 382/232, 233, 236, 238, 239, 100; 395/200.77; 386/65, 62; 713/176

[56] References Cited

U.S. PATENT DOCUMENTS

| | | | |
|---|---|---|---|
| 5,768,535 | 6/1998 | Chaddha et al. | 395/200.77 |
| 5,809,139 | 9/1998 | Girod et al. | 380/5 |
| 5,821,986 | 10/1998 | Yuan et al. | 348/17 |
| 5,923,811 | 7/1999 | Kawamura et al. | 386/65 |
| 5,930,369 | 7/1999 | Cox et al. | 380/54 |
| 5,937,095 | 8/1999 | Machida | 382/233 |

OTHER PUBLICATIONS

Information technology—Generic coding of moving pictures and associated audio information: Video (ITU–T Rec. H.262 (1995E), from Internatation Standard ISO/IEC 13818–2, First Edition May 15, 1996, pp. 39 and 50.

*Primary Examiner*—Amelia Au
*Assistant Examiner*—Vikkram Bali

[57] ABSTRACT

A method and apparatus for embedding and retrieving an additional data bitstream in an encoded data stream, such as MPEG. The embedded data is processed and a choice parameter in the header portion of the encoded data stream is varied according to the embedded information bit pattern. Optimization of the encoded data stream is not significantly affected. The embedded information is robust in that the encoded data stream would need to be decoded and re-encoded in order to change a bit of the embedded information. As relevant portions of the header are not scrambled to facilitate searching and navigation through the encoded data stream, the embedded data can generally be retrieved even when the encoded data stream is scrambled.

20 Claims, 6 Drawing Sheets

METHOD AND APPARATUS FOR EMBEDDING AND RETRIEVING ADDITIONAL DATA IN AN ENCODED DATA STREAM

FIELD OF INVENTION

This invention relates to embedding an additional low data-rate bitstream into an encoded or compressed data stream in a manner that makes it difficult to remove the bitstream data without performing decoding or decompression of the data stream. The bitstream data remains accessible for decoding even if the encoded or compressed data stream is scrambled, as the bitstream data is derived from unscrambled header information.

BACKGROUND OF THE INVENTION

Video image sequences can be encoded or compressed in many different formats, with one of the most common compression schemes being MPEG (Motion Pictures Expert Group). A typical MPEG data stream consists of a sequence of compressed images with appropriate header information. The compressed images may be of three kinds: (1) I-Pictures or Intra-coded images, which are compressed using spatial compression involving a present image. I-Pictures may therefore be completely de-compressed (or reconstructed) without reference to any other image. (2) P-Pictures or Predictive-coded images which use all or part of a previous image as a reference. Compression of these images uses temporal redundancy between the reference image and the present image to achieve higher compression. However, P-Picture images require the I reference image in order to be de-compressed. (3) B-Pictures or Bi-directionally predictive-coded images. These images can avail of more than one reference image for exploiting for exploiting temporal redundancy and so, can be more efficiently compressed.

A sequence of images or pictures is typically divided into Groups of Pictures (referred to as GOPs), with each GOP typically consisting of a sequence of I, P, and B pictures. A typical picture sequence might consist of I, B, B, P, B, B, P, B, B, P, B, B, P, B etc. To limit error propagation and facilitate editing functions, each GOP typically has a duration of approximately 0.5 seconds.

It is unusual to have two P-Pictures in succession in such an MPEG sequence, as this often does not yield optimum compression. However, such sequences are equally valid within the MPEG standards. A scheme to encode additional information into an MPEG data stream based upon varied sequencing of the I, P, and B Pictures within a GOP has been proposed by Philips. This scheme is commonly referred to as PTY (i.e. picture-type). The scheme relies on requiring the encoder to sometimes make the unusual choice of encoding two consecutive P-Pictures and uses this as the basis for an alphabet. Such embedded data could be used, for example, to carry the copyright status of the video content. Such embedded data is tamper resistant to the extent that to alter or corrupt the data, the I, P, B GOP sequence must be modified. This cannot be readily accomplished without de-compressing and re-compressing at least some of the video sequence, which represents a significant barrier to tampering.

A significant limitation exists, however, with such prior data embedding schemes if the compressed data is also scrambled. One such scrambling scheme is CSS (Content Scramble System) for use with DVD drives. Scrambling typically makes the embedded data unavailable for use unless the data stream is first descrambled. This limits the use of embedded data in applications such as conditional play control and record control. Moreover, in applications where the embedded data might be used to convey copy protection information, scrambling might be used to obscure such information and thus defeat copy protection.

Hence, what is needed in the field is a robust method of carrying additional information in a compressed data stream in a manner that makes it available even if the compressed data stream is scrambled.

SUMMARY OF THE INVENTION

The invention described herein provides a method and apparatus for embedding a low data channel or bitstream in a encoded or compressed data stream. While the terms encoded and compressed can be used interchangably, the invention is also applicable to both encoded or compressed data schemes. In particular, encoding or compression schemes such as MPEG provide a variety of choices which can be used to optimize encoding the data stream. For example, the first picture of a GOP may be encoded as a frame or as two fields. Furthermore, when encoding as two fields, the second field may be encoded as a P-field. When encoding motion pictures, there is little difference in compression efficiency between encoding the initial picture as an I-frame or as an interlaced I-field and P-field. Hence, the choice of which encoding format to use for the first picture in a GOP can serve as the basis for encoding a single bit of data in the ongoing data stream without noticeably affecting the size of the resulting data stream. This embedded data is difficult to modify in that it requires de-compressing and re-compressing (or decoding and re-encoding) at least some of the data stream in order to change a one to a zero, or vice versa, or to achieve some other manner of corruption.

Additionally, this embedded data stream is not affected by scrambling of the encoded or compressed data stream. For MPEG data, the choices regarding the encoding format for the initial picture is readily available at the beginning of a each sequence of pictures as header information. Such data sequences generally begin, for instance, on fixed length data sector boundaries and these data sectors are not generally scrambled to facilitate such functions as searching. Hence to retrieve the embedded information, only the header information for each GOP needs to be read and thereafter used to form the resulting bistream. The resulting bitstream can then be decoded to reveal whatever information has been embedded therein. Hence scrambling does not affect the integrity of the embedded data, and no de-scrambling (or decoding) must be performed in order to access the embedded data.

This method could also be applied to other types of encoded data which may or may not use picture or frame type structures. The method and apparatus would be essentially the same, except that particular segments of encoded data would be formatted according the bitstream pattern of the embedded data. As before, header segments (which are not scrambled, or are partially scrambled) would contain the encoding choice data. The resulting encoded data would be relatively unaffected in size and/or effectiveness due to the encoding format choices made. The encoding choice data would then be used to derive and formulate the bitstream pattern for later decoding and use.

Other advantages of this invention will become apparent from the following description taken in conjunction with the accompanying drawings which set forth, by way of illustration and example, certain embodiments of this invention. The drawings constitute a part of this specification and include exemplary embodiments, objects and features of the present invention.

DETAILED DESCRIPTION OF THE PREFERRED EMBODIMENT

A preferred embodiment of the invention provides a robust method of embedding an additional data bitstream into a compressed data stream such as MPEG using information that is available in high level headers of the MPEG data stream, such as, but not limited to, video sequence header, group of pictures (GOP) header, or picture header. The data bitstream cannot be readily altered without decompressing and then re-compressing the data stream. Additionally, the data bitstream which is derived from the header information is available even if the picture data, or other frame oriented data, is scrambled or partially scrambled.

In the particular case of CSS (Content Scrambling System) which is often used in DVD applications, a fixed portion of all 2 KByte data sectors is typically not scrambled to ensure that navigation information is always available. High level header information within the MPEG data stream, down to the picture header of the first picture or image in a group of pictures, is also located close to the beginning of the 2 KByte data sectors and therefore is also not scrambled. Other scrambling techniques must similarly reserve such data from scrambling in order to facilitate searching and navigating through the data stream.

Figure 1:
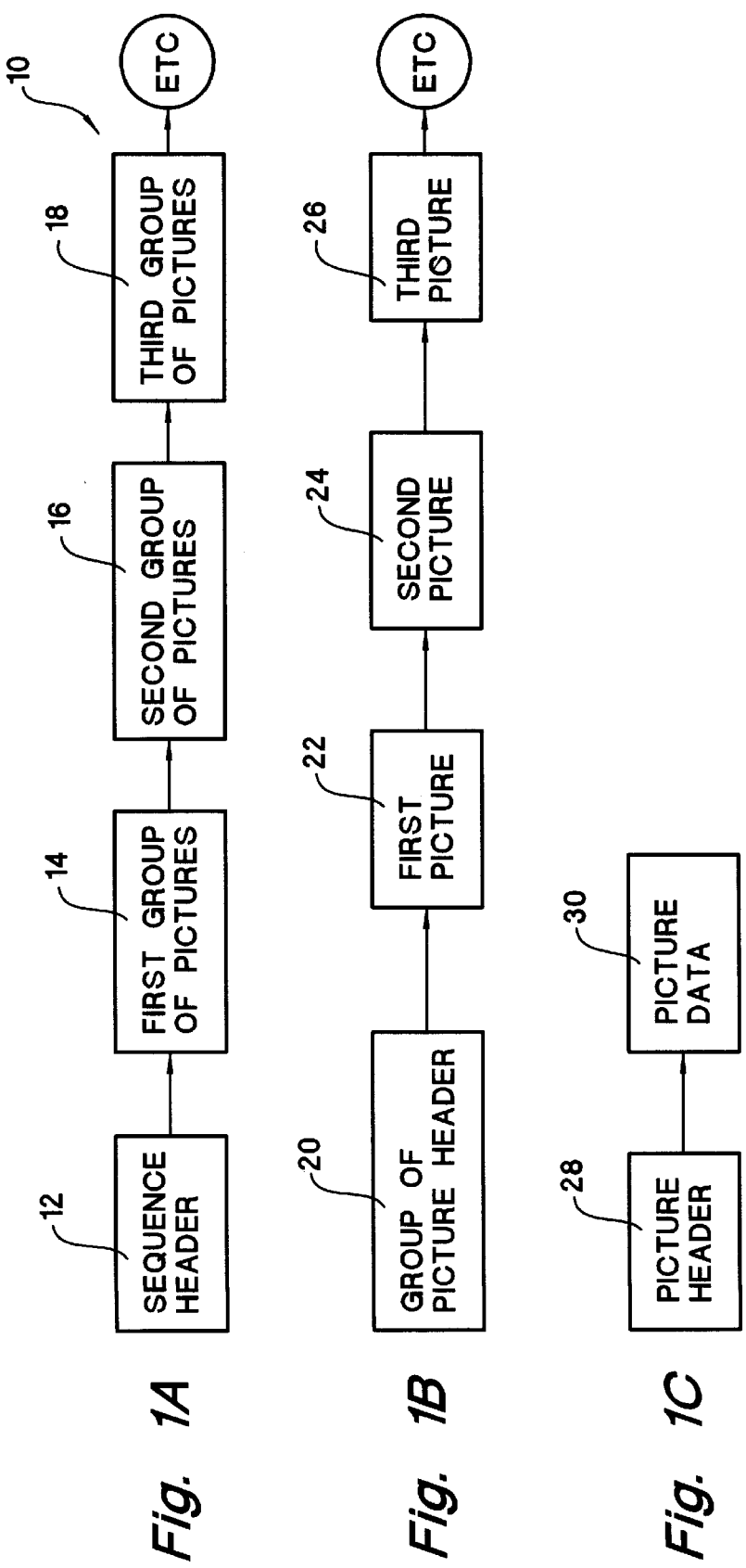
FIGS. 1(a)–1(c) show a prior art sequence of pictures which comprise a typical compressed data stream such as MPEG.

FIG. 1(a) shows a prior art sequence of data 10 which might typically be found in an MPEG sequence. The data 10, in this instance, is comprised of a sequence header 12 followed by a first group of pictures 14, a second group of pictures 16, a third group of pictures 18, and so forth. FIG. 1(b) shows a depiction of the elements which might comprise a Group of Pictures (GOP). These elements include a Group of Picture header 20, followed by a first picture 22, a second picture 24, a third picture 26, and so forth. FIG. 1© shows a further breakdown of such data, with each picture having a picture header 28 and picture data 30. A similar structure would exist for other picture or frame oriented data.

Figure 2:
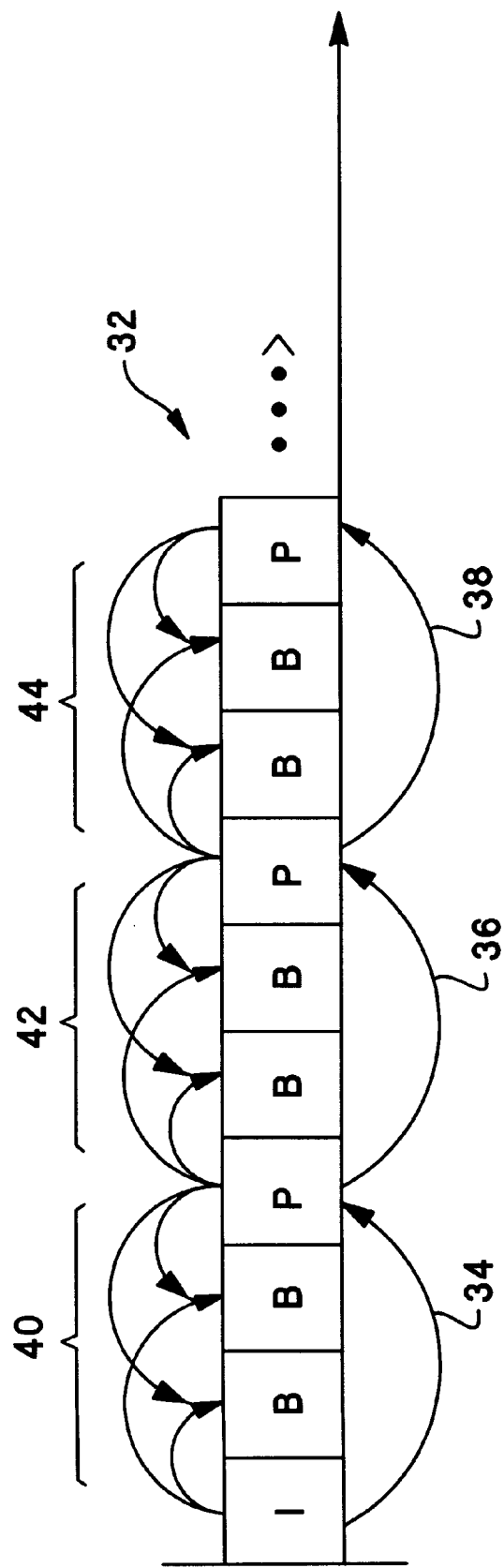
FIG. 2 shows a prior art sequence of Pictures which comprises an MPEG data stream.

FIG. 2 shows a prior art sequence of pictures (or frames) 32 which might comprise a typical MPEG data sequence in any given GOP. This particular sequence proceeds with the Pictures I, B, B, P, B, B, B, P, B, B, P, and so on. Intra coded Pictures (I-Pictures) are coded without reference to other pictures, and provide access points to the coded sequence where coding can begin, but are coded with only moderate compression. Predictive Coded Pictures (P-Pictures) are coded more efficiently using motion compensated prediction from a past I or P-coded picture and are generally used as a reference for further prediction as shown by arrows 34, 36, and 38. Bidirectionally-predictive Coded Pictures (B-Pictures) provide the highest degree of compression, but require both past and future reference pictures for motion compensation, as shown by the intersecting sets of arrows 40, 42, and 44. B-Pictures are generally never used as references for prediction. The organization of the three picture-types in a sequence is very flexible. The choice is left to the encoder and will depend on the requirements of the application.

There are many choices that can be made when encoding a picture sequence and in a number of cases, a very few bits located in the header information describe these choices. These bits cannot be tampered with, without reprocessing the picture sequence such that it corresponds to the choice defined by these bits. Hence, the present invention uses this availability of choice to carry additional embedded information. Such choices are typically made on the basis of what format will provide, for instance, the most optimal compression. Sometimes there is little optimization difference produced by the choice made, as in the case of choosing either an I-frame or an I-field/P-field combination for frame based sequences. This is the preferred type of choice. Yet, it is also sometimes practical to sacrifice a degree of optimization of encoding in order to use some choice-bandwidth for other purposes, such as carrying additional embedded information.

Figure 3:
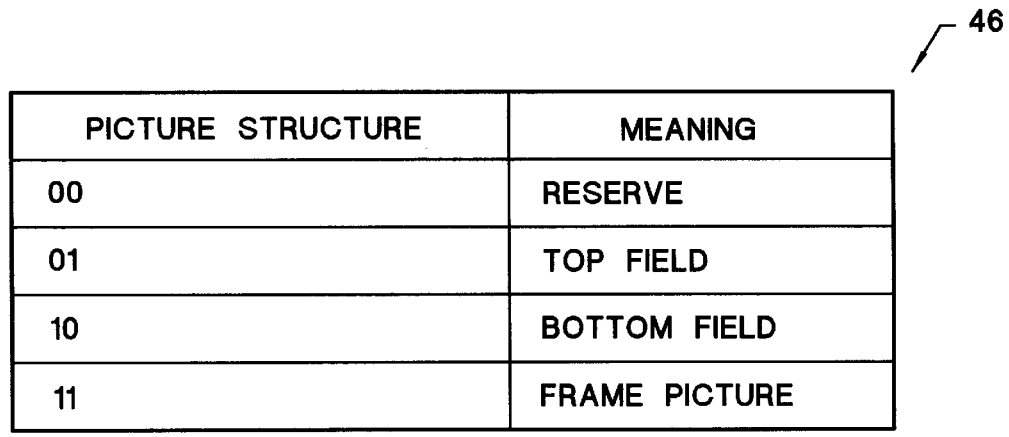
FIG. 3 shows a table of choices associate with the standard for encoding an MPEG data stream.
Figure 4A:
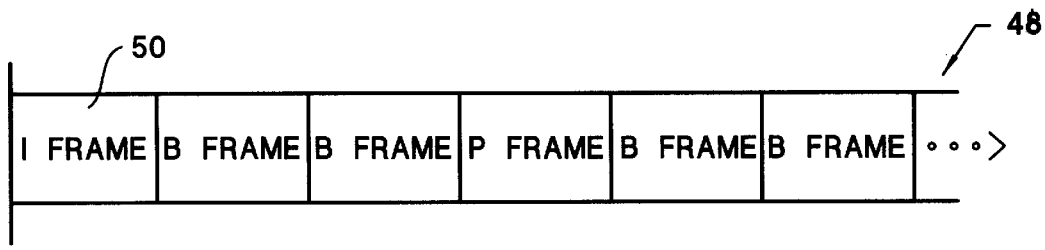
FIG. 4(a) shows an MPEG Picture sequence with an I-frame as the initial picture.
Figure 4B:
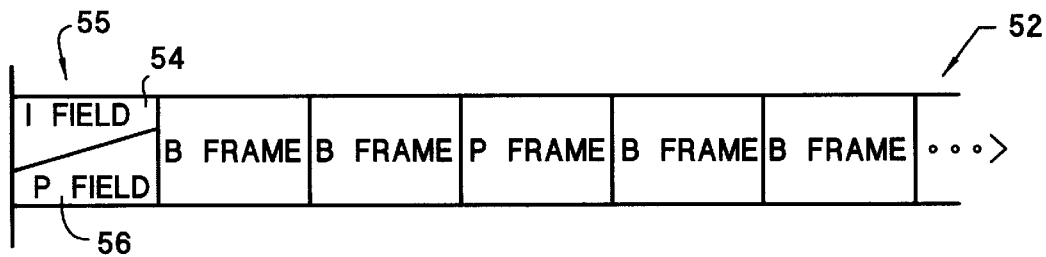
FIG. 4(b) shows an MPEG Picture sequence with an interlaced I-field and P-field forming the initial picture.
Figure 4:
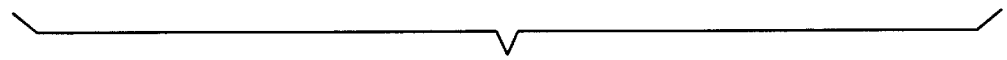

For the purposes of this example, the two bits defining the picture-structure parameter are used to carry the additional embedded information. However, the invention applies equally to other syntax definition data that might exist in headers and therefore can be used for carrying embedded information. FIG. 3 shows a table 46 with bit variations for the picture-structure parameter of an MPEG data stream. This picture-structure parameter is a 2-bit integer which is stored in the picture header of the first picture of a group of pictures (see again FIG. 1). As shown, the value 00 is reserved, or not used. If the choice is made to encode a picture as a frame picture, such as an I-frame, then the two bit picture structure parameter of value 11 is used. If the choice is made to encode a picture as a top-field, then the two bit picture structure parameter of value 01 is used. FIG. 4(a) shows an example of an MPEG data stream 48 with the initial picture 50 configured as an I-frame, which would have a corresponding picture structure value of 11. FIG. 4(b) shows an alternative MPEG data stream 52 with the initial picture configured as a top I field, which would have a corresponding picture structure value of 01 (this might typically be followed by a P field, however, only the picture structure of the first images in a GOP are involved in the additional embedded data stream).

Figure 5:
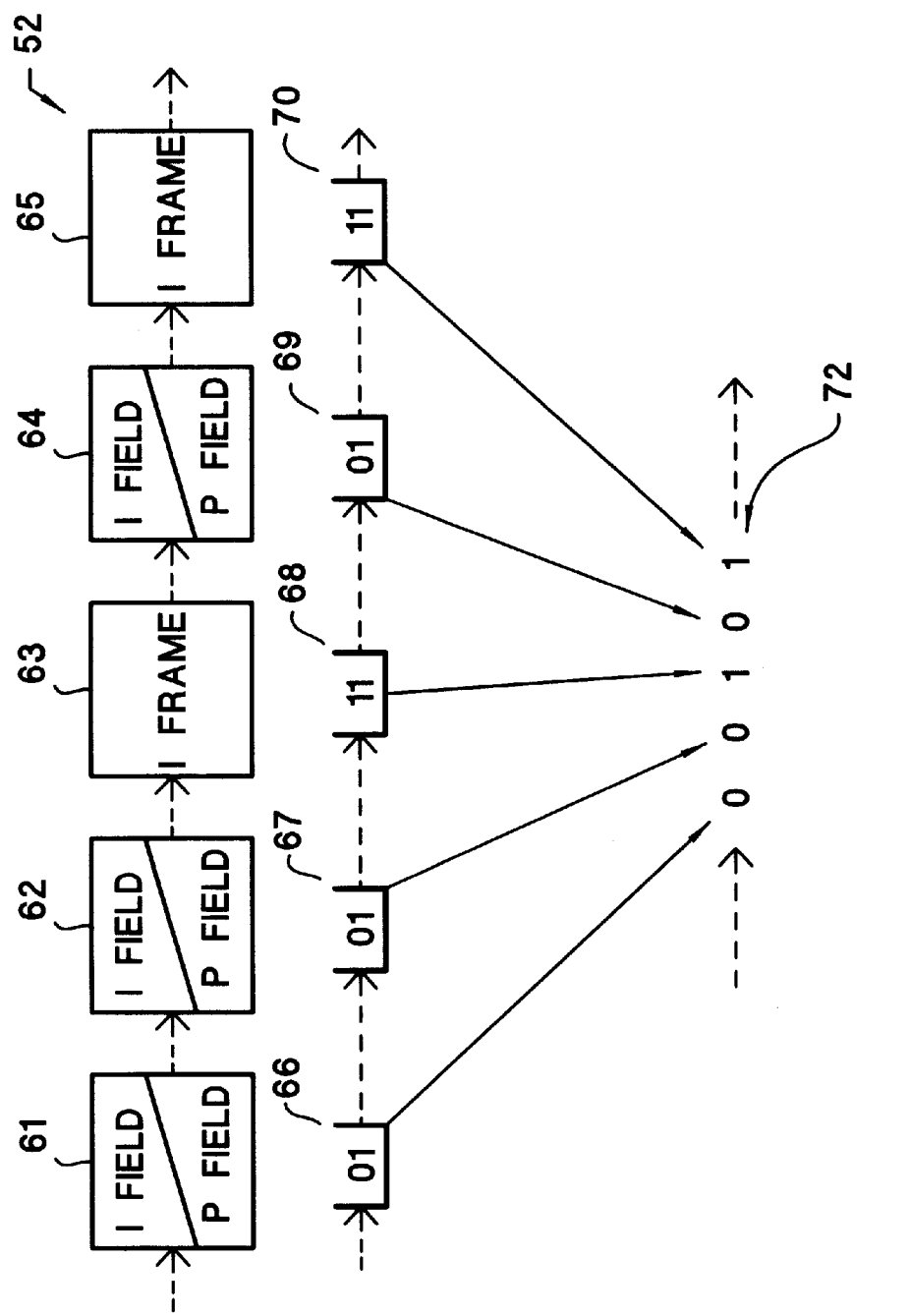
FIG. 5(a) shows a sequence of initial pictures within an overall sequence of GOPs which might exist in a typical compressed data stream, with some of the pictures comprised of an I-frame and others comprised of an interlaced I-field and P-field.
FIG. 5(b) shows the picture structure bits, per the table of FIG. 3, as found in the header information for each respective initial picture type in FIG. 5(a).
FIG. 5(c) shows the resulting embedded bitstream which might be derived from assigning a one-bit representation to each set of picture structure bits.

FIG. 5(a) shows a sequence 60 of initial pictures 61–65 (and so forth) which would occur with each subsequent GOP in an MPEG data stream. In this example, the initial pictures 61–65 are encoded as an I-field/P-field, I-field/P-field, I-frame, I-field/P-field, and I-frame respectively. FIG. 5(b) shows the respective sequence of picture-structure bit values 66–70 which correspond to each initial picture 61–65. FIG. 5(c) shows the resulting bitstream sequence 72 which corresponds to assigning a desired bit value to each picture-structure value 66–70. This bitstream data 72 can thereby be manipulated to produce known bit patterns which can be used to carry low-level data or information. Such data might include, for instance, copyright, copy protection, authentication, and related information, and/or various other types of additional information such as synchronization sequences and error correction information.

This embedded data is difficult to modify since merely changing the two picture-structure bits without modifying the initial picture structure would lead to incorrect decoding. This means that to corrupt this additional data channel, the images or pictures must be decoded and re-encoded (or decompressed and recompressed). Furthermore, since the first I-picture is used as a reference for the rest of the GOP, any artifacts introduced by re-encoding (including deliberately contrived artifacts) will propagate to subsequent images in the GOP. This effectively requires the complete movie (or other data sequence) to be decoded and re-encoded in order to remove the additional embedded data, in that it requires decoding and re-encoding in order to change a one to a zero, or vice versa.

Figure 6:
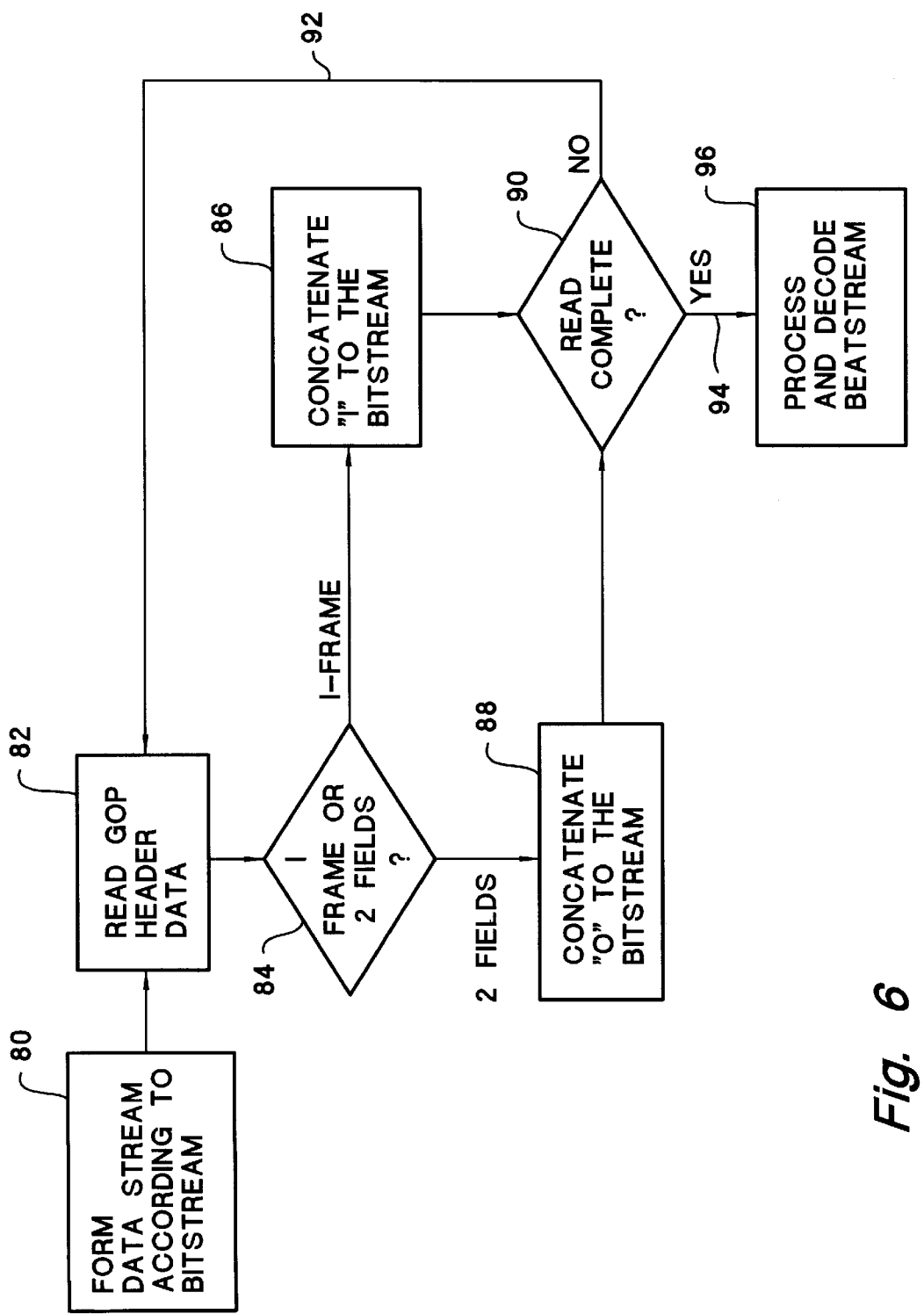
FIG. 6 shows a flowchart of the typical steps or processes which might be used to read, formulate and decode an embedded data bitstream.

FIG. 6 shows a flowchart of the general steps involved in forming, reading, and decoding an embedded bitstream. According to the general process shown in FIGS. 5(a)–5(c) step 80 represents the process of forming the data stream according to the desired bitstream to be embedded. Step 82 shows the process of reading the GOP (or other type) header data from the encoded data stream. Step 84 shows the decision process of detecting whether an I-frame or an I-field/P-field was used to form the initial picture in each GOP. If an I-frame was used, step 86 shows the process of concatenating a "1" bit to the bitstream. If 2 fields were used, step 88 shows the process of concatenating a "0" bit to the bitstream. Generally, any value could be concatenated in order to form the bitstream, and long as the bitstream decoder was correspondingly configured to recognize and decode such values. Step 90 shows the decision process of whether enough header data has been read according to the needs of any particular user. If more data is needed, then path 92 returns control to the header reading step 82. If the process is complete, then path 94 passes control to step 96 which shows the processing and decoding of the formed bitstream.

Figure 7:
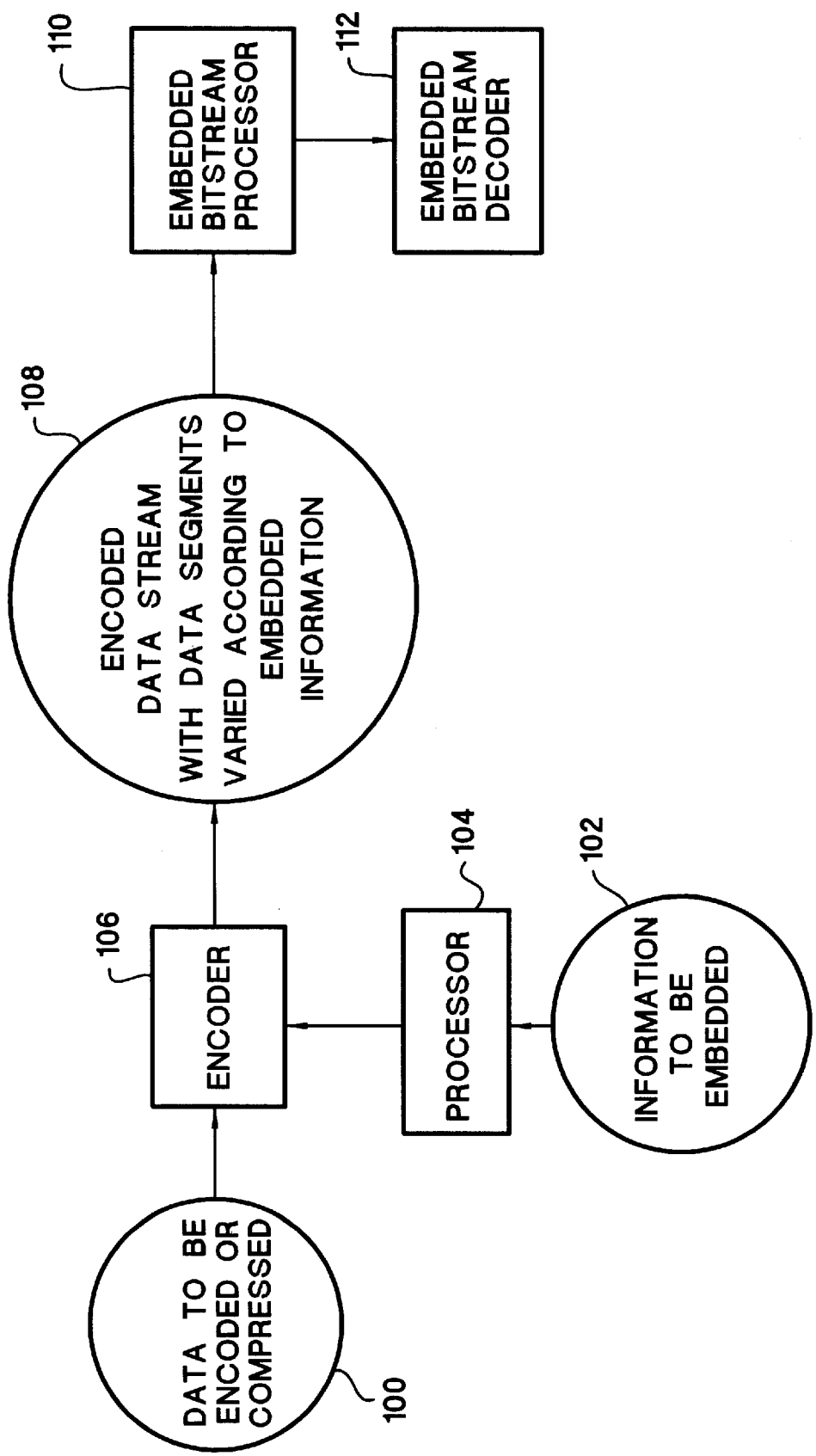
FIG. 7 shows a generalized block diagram of an apparatus for forming and extracting the embedded bitstream in a compressed data stream.

FIG. 7 shows a generalized block diagram of an apparatus for embedding informational or other types of data in an compressed, or encoded, data stream, whereby the embedded bitstream is thereafter extracted and decoded. Circle 100 represents the data to be encoded or compressed. Circle 102 represents the information to be embedded in the encoded data stream. Information 102 is processed by block 104 to provide a set or stream of instructions to be used by the encoder 106. Alternatively, such processing of information 102 might be included within the encoder 106. Circle 108 thereby represents the encoded data stream with data segments varied corresponding to the embedded information 102. With MPEG data, these data segments would typically correspond to initial pictures in each GOP (or initial pictures for a group of GOPs). In MPEG, a sequence header is typically followed by one or more GOPs; but having only one GOP facilitates random access. The encoded data stream 108 is then processed by processor block 110 which reads and formulates the embedded bitstream. The bitstream can thereafter be decoded by the decoder device shown in block 112.

It is to be understood that while certain forms of the invention are illustrated, they are not to be limited to the specific forms or arrangements of parts herein described and s shown. While an MPEG data stream is shown which uses picture data arranged in Groups of Pictures with an appropriate header, other types of data formats might similarly be used. For instance the disclosed approach might be used in conjunction with the PTY scheme described above from Philips. Similarly, the invention applies to other schemes based, for example, on using choice-bandwidth in high-level headers which are typically not scrambled, the choice-bandwidth being associated with other attributes such as motion vectors, quantization tables, and the like. Hence, it will be apparent to those skilled in the art that various changes may be made without departing from the scope of the invention and the invention is not to be considered limited to what is shown in the drawings and descriptions.

What is claimed is:

1. A method for embedding an additional low data-rate bitstream in a digital video stream and retrieving the additional low data-rate bitstream from a digital video encoded version of the digital video stream, the digital video encoded version of the digital video stream having a plurality of data segments with header information and at least two digital video encoding format choices for each data segment, the method comprising the steps of:

(a) providing the additional low data-rate bitstream, the additional low data-rate bitstream having bit values that are to be embedded in the digital video stream;

(b) using each bit value to select which one of the at least two digital video encoding format choices will be used to encode data segments of the digital video stream, the selected digital video encoding format choices being readable from the header information;

(c) digital video encoding the data segments of the digital video stream according to the digital video encoding format choice that is selected for each data segment;

(d) reading the selected digital video encoding format choice from the header information for each data segment of the digital video encoded version of the digital video stream;

(e) identifying the bit values represented by the selected digital video encoding format choice read from the header information for each data segment; and (f) concatenating the identified bit values to regenerate the additional low data-rate bitstream.

2. The method of claim 1, wherein the digital video encoded version of the digital video stream is at least partially scrambled but the header information remains readable without any descrambling of the digital video encoded version of the digital video stream.

3. The method of claim 1, wherein the digital video encoded version of the digital video stream is at least partially scrambled but the header information remains readable with only partial descrambling of the digital video encoded version of the digital video stream.

4. The method of claim 1, wherein the additional low data-rate bitstream cannot be altered without the additional steps of decoding and re-encoding the digital video stream.

5. The method of claim 1, wherein the digital video stream is digital video encoded according to MPEG.

6. The method of claim 5, wherein the plurality of data segments includes Group of Pictures (GOPs) comprising an MPEG data stream, and at least one segment of the digital video stream in step (b) includes the initial I-picture in a GOP.

7. The method of claim 5, wherein the plurality of data segments includes Group of Pictures (GOPs) comprising an MPEG data stream, and at least one data segment of the digital video stream in step (b) includes the initial I-picture in a group of GOPs.

8. The method of claim 6, wherein the at least two digital video encoding format choices in step (b) includes choosing between a frame and a pair of fields.

9. The method of claim 8, wherein the frame is an I-frame and the pair of fields is an I-field and an interlaced P-field.

10. An apparatus for embedding an additional low data-rate bitstream in a digital video stream and retrieving the additional low data-rate bitstream from a digital video encoded version of the digital video stream, the digital video encoded version of the digital video stream having a plurality of data segments with header information and at least two digital video encoding format choices for each data segment, the apparatus comprising:
  (a) a processor means for receiving information to be embedded and producing the additional low data-rate bitstream;
  (b) an encoder means for receiving the additional low data-rate bitstream and the digital video stream and producing the digital video encoded version of the digital video stream with the digital video encoding format for each data segment being chosen and encoded according to bit values that make up the additional low data-rate bitstream, the digital video encoding format choice for each data segment being identified within the respective header information;
  (c) a processor means for reading the header information of the digital video encoded version of the digital video stream and identifying the bit values that make up the additional low data-rate bitstream; and
  (d) a decoder means for reading the additional low data-rate bitstream that includes the identified bit values.

11. The apparatus of claim 10, wherein the digital video encoded version of the digital video stream is scrambled but the header information remains readable with only partial descrambling of the digital video encoded version of the digital video stream.

12. The apparatus of claim 10, wherein the digital video encoded version of the digital video stream is scrambled but the header information remains readable without any descrambling of the digital video encoded version of the digital video stream.

13. The apparatus of claim 10, wherein the additional low data-rate bitstream cannot be altered without decoding and re-encoding the digital video encoded version of the digital video stream.

14. The apparatus of claim 10, wherein the digital video encoded version of the digital video stream is MPEG.

15. The apparatus of claim 10, wherein the data segments include Group of Pictures (GOPs) comprising an MPEG data stream, and the digital video encoding format choice is used to format the initial I-picture in a GOP.

16. The apparatus of claim 10, wherein the data segments include Group of Pictures (GOPs) comprising an MPEG data stream, and the digital video encoding format choice is used to format the initial I-picture for a group of GOPs.

17. The apparatus of claim 10, wherein the digital video encoding format choice is used to choose between a frame and a pair of fields.

18. The apparatus of claim 10, wherein the processor means and encoder means of elements (a) and (b) are combined, and the processor means and decoder means of elements (c) and (d) are combined.

19. A method for managing digital video comprising the steps of:
  (a) providing a digital video stream that is to be digital video encoded into a plurality of segments, wherein each of the segments includes header information that identifies one of at least two picture structures for the segment;
  (b) providing an additional low data-rate bitstream that includes bit values that are to be embedded into the digital video stream;
  (c) selecting one of the at least two picture structures based on a bit value from the low data-rate bitstream, wherein each of the two picture structures represents a different bit value;
  (d) digital video encoding one of the plurality of segments of the digital video stream utilizing the selected picture structure, the selected picture structure being readable from the header information of the one segment;
  (e) repeating steps (c) and (d) for a series of the bit values from the additional low data-rate bitstream;
  (f) reading the header information for multiple segments of the plurality of segments to determine the picture structure of each of the multiple segments;
  (g) identifying the bit values that are represented by the picture structure of each of the multiple segments; and
  (h) generating the low data-rate bitstream from the identified bit values.

20. The method of claim 19 wherein said step of selecting one of at least two picture structures includes a step of selecting between an I-frame and an I-field interlaced with a P-field.

\* \* \* \* \*